(12) United States Patent
Criado

(10) Patent No.: US 8,954,206 B2
(45) Date of Patent: Feb. 10, 2015

(54) UNMANNED AERIAL VEHICLE

(71) Applicant: The Boeing Company, Chicago, IL (US)

(72) Inventor: Alfredo Criado, Madrid (ES)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 13/767,735

(22) Filed: Feb. 14, 2013

(65) Prior Publication Data
US 2014/0129056 A1 May 8, 2014

(30) Foreign Application Priority Data
Feb. 17, 2012 (EP) .................................. 12382052

(51) Int. Cl.
B64C 19/00 (2006.01)
B64C 31/02 (2006.01)
(Continued)

(52) U.S. Cl.
CPC ............... *B64C 19/00* (2013.01); *G05D 1/105* (2013.01); *G05D 1/0005* (2013.01); *B64C 2201/021* (2013.01); *Y02T 50/53* (2013.01); *B64C 39/024* (2013.01); *B64C 31/024* (2013.01); *B64C 2201/042* (2013.01); *B64C 31/02* (2013.01)
USPC ................ 701/4; 244/16; 244/76 R; 244/190; 244/75.1; 244/195; 244/58; 244/180; 244/53 R; 244/6; 701/3; 701/2; 701/5; 701/8; 701/11; 290/44; 290/55; 180/65.31; 180/65.1

(58) Field of Classification Search
CPC ............ F05B 2240/921; B64C 31/024; B64C 2201/042
USPC ............................................................. 701/5
See application file for complete search history.

(56) References Cited

U.S. PATENT DOCUMENTS 2,368,630 A * 2/1945 Bizjak ............................ 244/58
3,957,230 A * 5/1976 Boucher et al. ............. 244/53 R
(Continued)

FOREIGN PATENT DOCUMENTS

DE 19828720 A1 12/1999
DE 102009050522 A1 5/2011
DE 102011103572 A1 12/2011

OTHER PUBLICATIONS

J. P. Barnes: Flight Without Fuel—Regenerative Soaring Feasibility Study, SAE Technical Paper 2006-01-2422, 2006, doi:10.427112006-01-2422.*

(Continued)

Primary Examiner — John R Olszewski
Assistant Examiner — Mohsen Ghajargar
(74) Attorney, Agent, or Firm — Yee & Associates, P.C.

(57) ABSTRACT

The present disclosure relates to an unmanned aerial vehicle (UAV) able to harvest energy from updrafts and a method of enhancing operation of an unmanned aerial vehicle. The unmanned aerial vehicle with a gliding capability comprises a generator arranged to be driven by a rotor, and a battery, wherein the unmanned aerial vehicle can operate in an energy harvesting mode in which the motion of the unmanned aerial vehicle drives the rotor to rotate, the rotor drives the generator, and the generator charges the battery. In the energy harvesting mode regenerative braking of the generator reduces the forward speed of the unmanned aerial vehicle to generate electricity and prevent the unmanned aerial vehicle from flying above a predetermined altitude.

13 Claims, 4 Drawing Sheets

(51) Int. Cl.
  *G05D 1/10* (2006.01)
  *G05D 1/00* (2006.01)
  *B64C 39/02* (2006.01)
  *B64C 31/024* (2006.01)

(56) References Cited

U.S. PATENT DOCUMENTS

| | | | |
|---|---|---|---|
| 3,966,143 A * | 6/1976 | Smith | 244/16 |
| 4,591,111 A * | 5/1986 | Laughter | 244/1 R |
| 5,730,394 A * | 3/1998 | Cotton et al. | 244/180 |
| 6,012,675 A * | 1/2000 | Cocatre-Zilgien | 244/16 |
| 6,059,233 A * | 5/2000 | Koppel et al. | 244/158.5 |
| 6,089,506 A * | 7/2000 | Scheffel | 244/76 R |
| 7,431,243 B1 * | 10/2008 | Allen | 244/195 |
| 7,898,789 B1 * | 3/2011 | Jarvinen | 361/218 |
| 8,167,234 B1 * | 5/2012 | Moore | 244/17.25 |
| 8,620,493 B2 * | 12/2013 | Hughes et al. | 701/3 |
| 8,626,362 B2 * | 1/2014 | Freissinet | 701/14 |
| 2004/0129071 A1 * | 7/2004 | Plaszowiecki | 73/170.16 |
| 2005/0109258 A1 * | 5/2005 | Smith | 114/274 |
| 2007/0252035 A1 * | 11/2007 | Hubbard | 244/75.1 |
| 2009/0076665 A1 * | 3/2009 | Hoisington et al. | 701/2 |
| 2010/0084513 A1 * | 4/2010 | Gariepy et al. | 244/190 |
| 2010/0230968 A1 * | 9/2010 | Chernyshov | 290/44 |
| 2013/0317667 A1 * | 11/2013 | Kruglick | 701/2 |
| 2014/0097290 A1 * | 4/2014 | Leng | 244/6 |

OTHER PUBLICATIONS

J. Philip Barnes, Flight without fuel—regenerative soaring feasibility study, SAE Technical Papers Series, 2006, 2006-01-2422.*
FAA Order 7130.3A, Holding pattern criteria, Mar. 18, 1998.*
FAA Air Traffic Bulletin, Issue # 2009-1, Apr. 2009.*
Allen, "Guidance and Control of an Autonomous Soaring UAV," National Aeronautics and Space Administration Technical Report No. NASA/TM-2007-214611, Feb. 2007, 31 pages.
European Search Report, dated Aug. 8, 2012, regarding Application No. EP12382052, 7 pages.

* cited by examiner

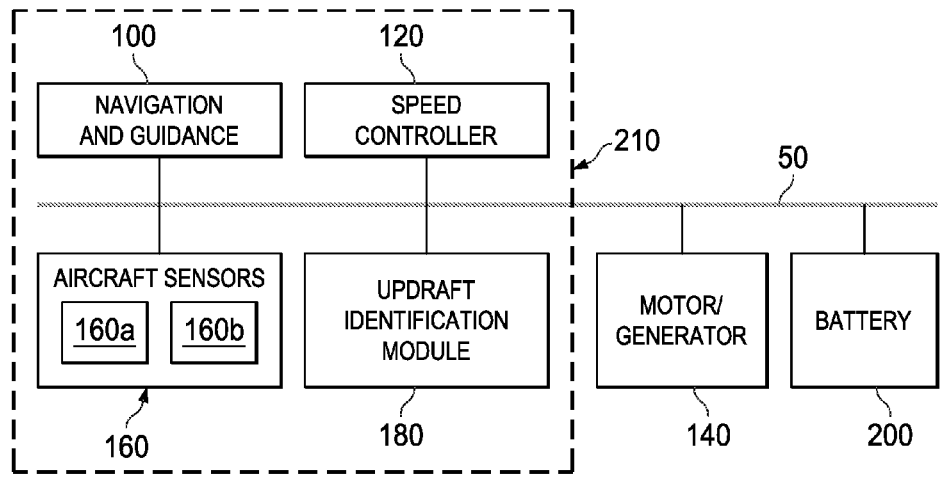
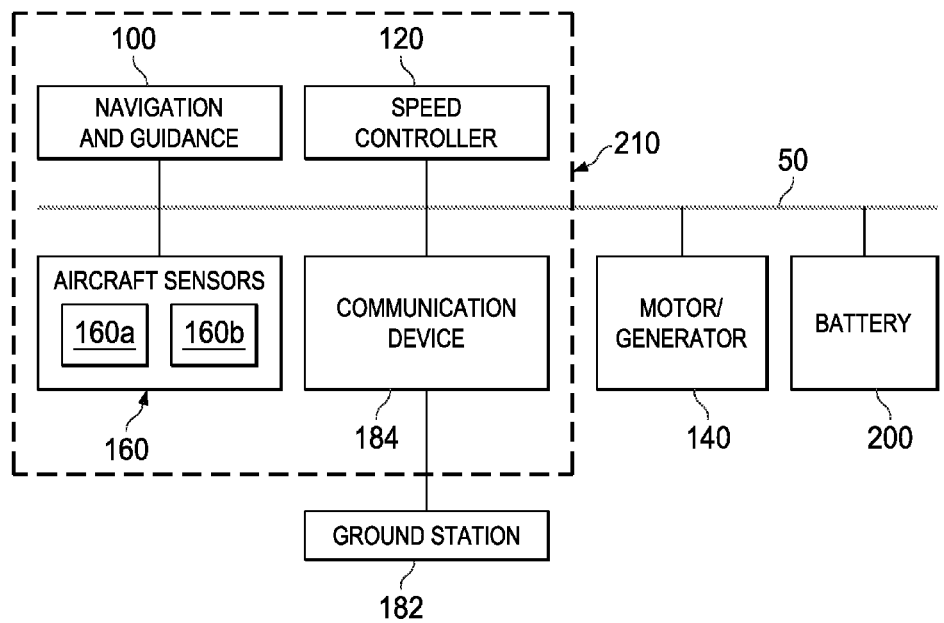

UNMANNED AERIAL VEHICLE

PRIORITY STATEMENT

This application claims priority to EP Patent Application Number 12382052, filed Feb. 17, 2012, the entire disclosure of which is incorporated by reference herein.

BACKGROUND INFORMATION

1. Field

The present disclosure relates to an unmanned aerial vehicle (UAV) able to harvest energy from updrafts and a method of operating an unmanned aerial vehicle.

2. Background

Pilots of gliders are aware of the potential to increase range and/or glide time (endurance) by utilising updrafts of air caused by the heating of the Earth's surface. These naturally occurring upward flows of air, often referred to as thermals, form in columns and can be utilised to lift or reduce the fall of a glider passing therethrough. Gliders can even circle within an updraft to gain a desired altitude up to a theoretical maximum altitude.

UAVs can take advantage of updrafts in the same way as gliders. However, in many countries UAVs are prohibited from flying in controlled airspace and may therefore be subject to an artificial ceiling that is lower than the true theoretical maximum altitude. As such, it is not always possible for a UAV to achieve the theoretically available height gains from updrafts.

There is therefore a need to provide a UAV that can derive benefit from an updraft when prohibited from climbing above a threshold altitude.

SUMMARY

According to a first aspect of the present disclosure, there is provided a method of enhancing operation an unmanned aerial vehicle with a gliding capability within a geographic region. The unmanned aerial vehicle comprises a generator arranged to be driven by a rotor.

The method comprises the steps of: defining a maximum altitude threshold for a geographic region, above which the UAV is not permitted to be flown; identifying the location of at least one updraft within the geographical area; manoeuvring the unmanned aerial vehicle within the identified updraft; and harvesting energy from the motion of the unmanned aerial vehicle within the updraft by regenerative braking of the rotor to thereby maintain an altitude at or below the maximum altitude threshold.

According to a second aspect of the present disclosure, there is provided an unmanned aerial vehicle with a gliding capability comprising a generator arranged to be driven by a rotor, and a battery.

The unmanned aerial vehicle can operate in an energy harvesting mode in which the motion of the unmanned aerial vehicle drives the rotor to rotate, the rotor drives the generator, and the generator charges the battery.

In the energy harvesting mode regenerative braking of the generator reduces the forward speed of the unmanned aerial vehicle to generate electricity and prevent the unmanned aerial vehicle from flying above a predetermined altitude.

Optionally, the unmanned aerial vehicle is arranged to store the harvested energy in a battery.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a better understanding of the disclosure and to show how the same may be put into effect, reference is now made, by way of example only, to the accompanying drawings in which:

FIG. 3 depicts a schematic representation of a first embodiment of a system for controlling a UAV;

FIG. 4 depicts a schematic representation of a second embodiment of a system for controlling a UAV.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
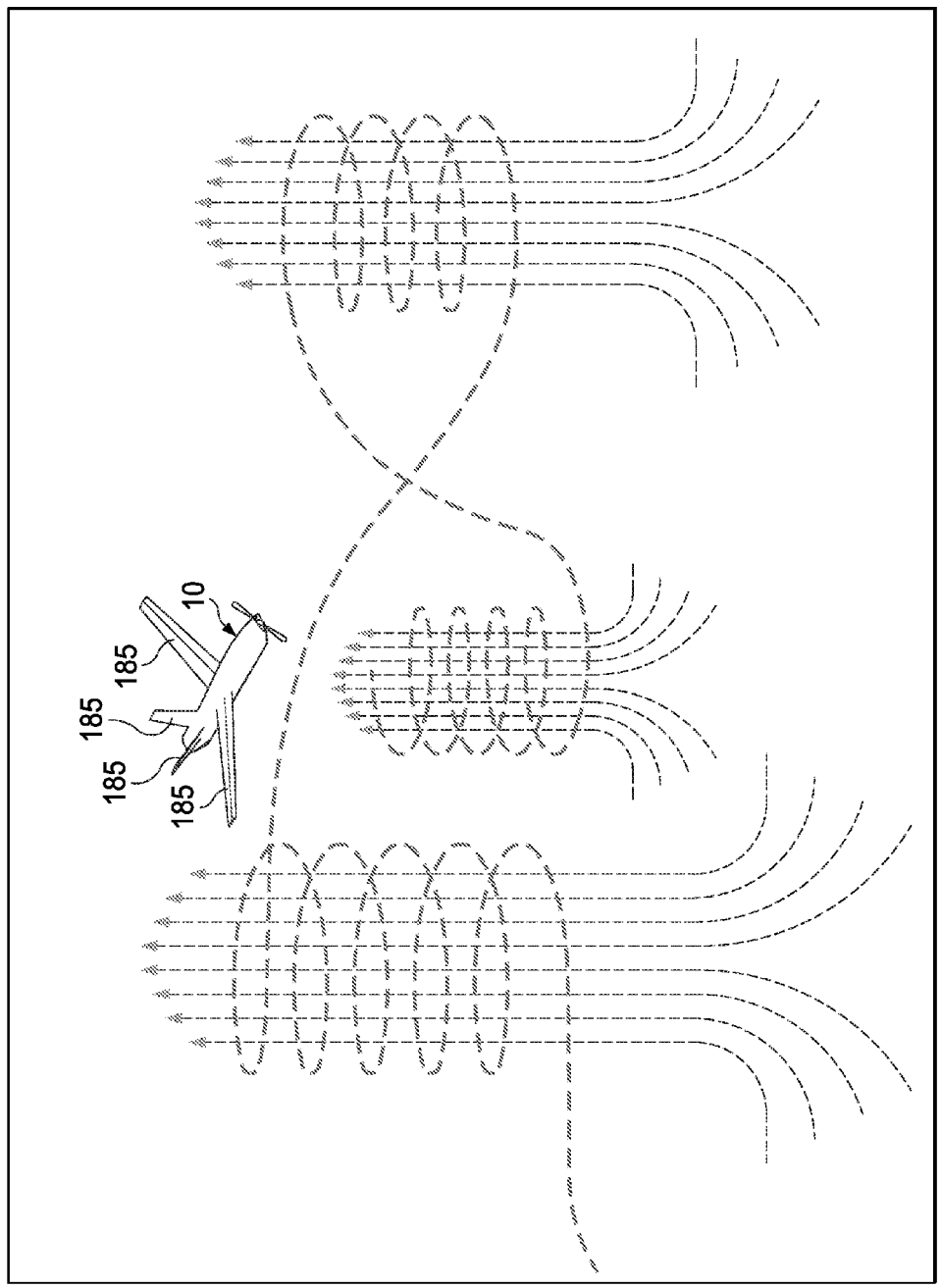
FIG. 1 shows a representation of a gliding UAV using updrafts.

As can be seen in FIG. 1, a UAV 10 may glide in a circular path within an updraft to ascend to a highest theoretical altitude achievable within that updraft. The UAV 10 may then descend as it glides to a neighbouring updraft, in which it may commence a further circling motion to ascend again to the highest theoretical altitude available for the new updraft.

When gliding in an updraft, the UAV 10 is subject to a force balance in the vertical direction. Specifically, the weight of the UAV 10 is balanced by the sum of the force applied by the updraft, with the lift provided by the forward motion of the aerodynamic surfaces 185 of the UAV 10 through air at a particular speed.

Any movable aerodynamic surfaces and the speed of the UAV 10 define the controllable parameters of the force balance. For a given angle of attack, at high speeds the aerodynamic surfaces 185 of the UAV 10 will result in a greater lift force and the UAV 10 will ascend. At low speeds the aerodynamic surfaces 185 of the UAV 10 will result in a lower lift force and the UAV 10 will descend. The altitude of a UAV 10 moving within an updraft can thus be controlled by modulating its forward speed and/or the angle of attack of its aerodynamic surfaces 185.

Figure 2:
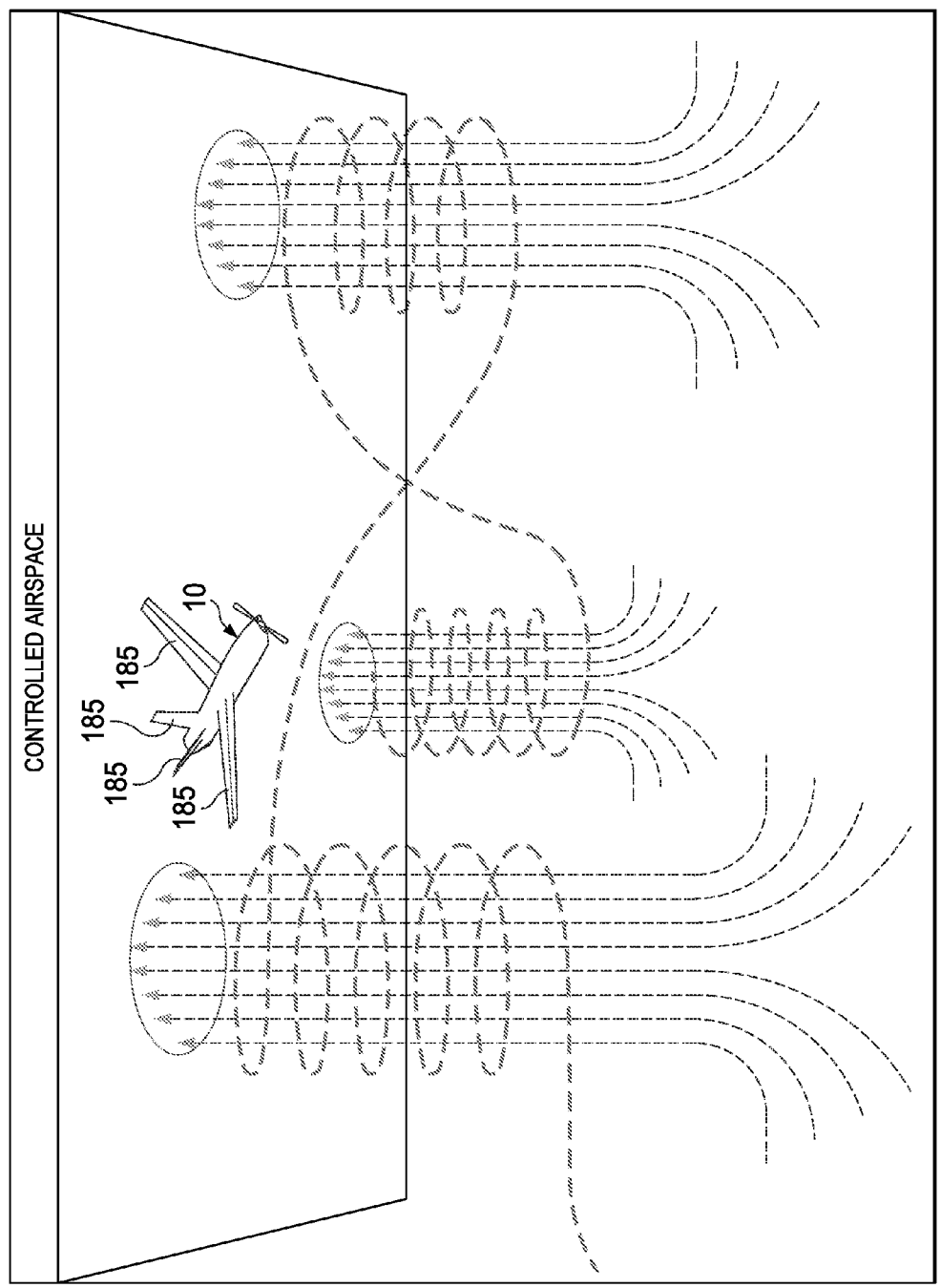
FIG. 2 shows a representation of an upper altitude threshold.

FIG. 2 shows controlled airspace superimposed on the updrafts of FIG. 1. Controlled airspace is defined above a threshold altitude. UAVs are not permitted in the controlled airspace and therefore the threshold altitude defines an artificial limitation on the altitude of UAVs.

In an illustrative embodiment of the disclosure, a UAV 10 is capable of gliding and harvesting energy from the forward motion of the UAV 10.

The UAV 10 is configured and arranged to automatically seek out updrafts and maintain a track (i.e. a path defined in two lateral dimensions in a horizontal plane), such as a circular track (e.g. an approximate helical path in three dimensions), within the updraft to gain height up to, but not above, a predetermined threshold altitude corresponding to the lower boundary of controlled airspace. When within the updraft, the UAV 10 prevents its altitude from increasing above the threshold altitude by harvesting energy from its forward motion using techniques described below.

Figure 5:
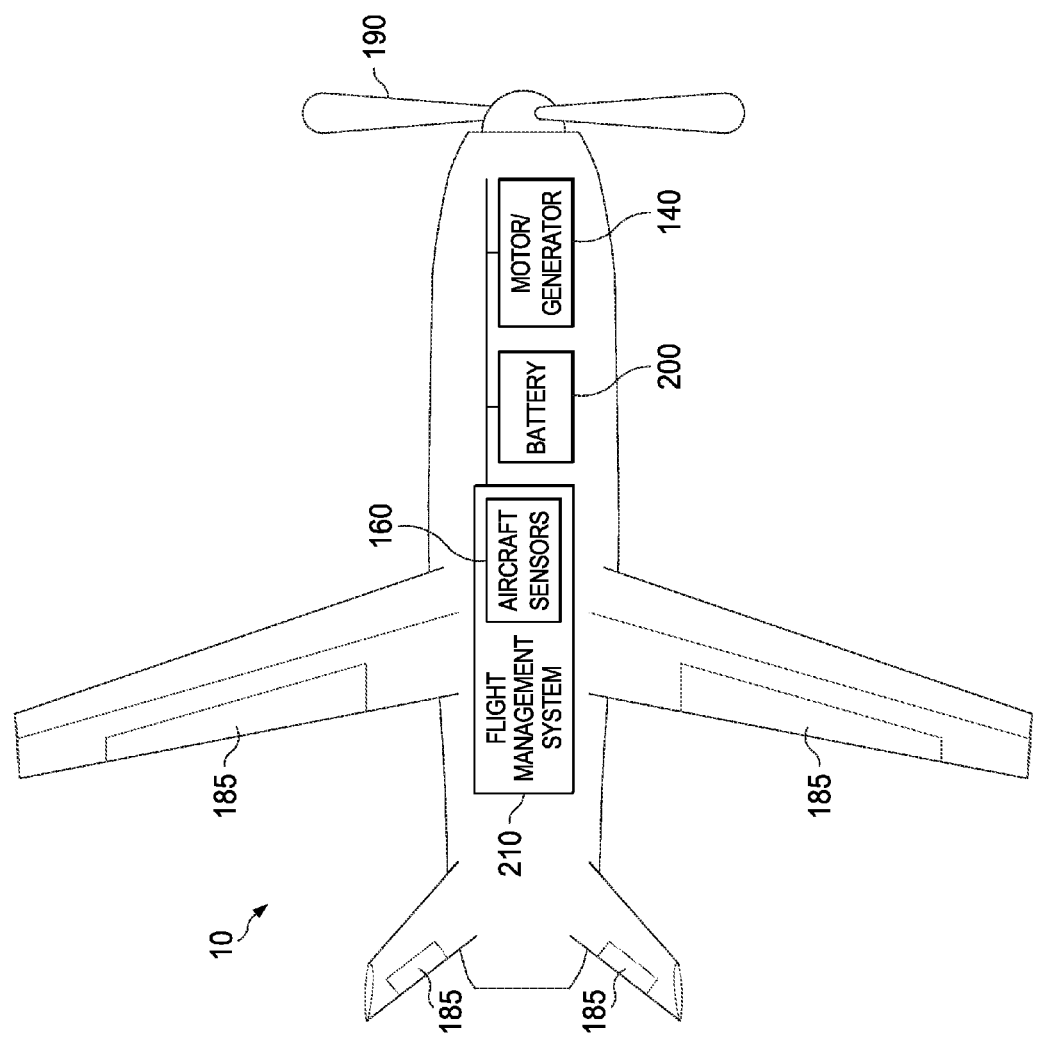
FIG. 5 depicts a schematic representation of a UAV.

As shown in FIG. 5, the UAV 10 preferably has a rotor 190. The rotor 190 may act as a turbine, i.e. the rotor 190 may be driven to rotate by the relative flow of air past the UAV 10. A motor/generator 140 is coupled to the rotor 190 to be driven thereby to generate electricity. The electricity can be used to charge a battery 200.

In illustrative embodiments, the UAV 10 is arranged to control the speed at which the rotor 190 is driven to rotate by the flow of air to control the rate at which energy is harvested from the UAV's forward motion, thereby controlling the drag on the UAV 10 and hence its forward speed and lift. By this mechanism the upward motion of the UAV 10 within the updraft can be controlled such that the threshold altitude is not exceeded.

In further illustrative embodiments, the UAV 10 can control the speed at which the rotor 190 rotates when flying in a looped or generally circular track (a circular or helical path in three dimensions) by controlling the UAV 10 bank angle and thereby controlling the radius of the track followed by the UAV 10 and hence its forward speed and lift. In other words, the amount of energy drawn from the forward motion of the UAV 10 can be modulated by varying the bank angle of the UAV 10 to thereby control the rate of change in altitude.

It is possible for the UAV 10 to have a separate propulsion means. In that case, motor/generator 140 may be a simple generator 140, i.e. not configured to drive the rotor 190. However, it is preferable that the motor/generator 140 also acts as a motor arranged to drive the rotor 190 to rotate. Thus, the rotor 190 may act as a propeller, i.e. the rotor 190 and the generator/motor 140 may be both an energy harvesting means, and a propulsion means for providing thrust. In such a UAV 10, it is therefore possible for a single motor/generator 140 to both provide thrust and to harvest energy. Preferably, the motor/generator 140 will be a brushless motor.

Preferably, the UAV 10 will comprise control surfaces 185 such as flaps or slats on the wings, and elevators or rudders on the empennage.

A flight management system 210 controls the UAV 10. FIG. 3 shows a schematic representation of the components of the flight management system 210 and how they can control the motor/generator 140 and the battery 200.

The flight management system 210 comprises: a navigation and guidance module 100; a speed controller 120; aircraft sensors 160; and an updraft identification module 180.

The motor/generator 140 is coupled to and arranged to drive or be driven by the rotor 190. In a powered mode, the motor/generator 140 acts as a motor to drive the rotor 190 to rotate. In a generator mode, energy is harvested from the forward motion of the UAV 10 by the motor/generator 140 acting as a generator such that rotation of the rotor 190 drives the generator to generate electricity.

In the generator mode, the motor/generator 140 provides power to the battery 200 to charge the battery 200. In the powered mode, the motor/generator 140 receives power from the battery 200 thereby depleting the charge stored by the battery 200.

The navigation and guidance module 100 controls how the UAV 10 manoeuvres to fly the UAV 10 from one location to another. For example, the navigation and guidance module 100 may control the control surfaces 185 of the UAV 10 (for example flaps or slats). The navigation and guidance module 100 monitors the lateral location (latitude and longitude) of the UAV 10 (for example, using a GPS receiver), and monitors the altitude of the UAV 10 using the signals from the aircraft sensors 160. The navigation and guidance module 100 can determine the current altitude threshold to prevent the UAV 10 from entering controlled airspace. The navigation and guidance module 100 may include a memory on which the altitude threshold is stored for a given location, or may communicate with an external device, such as an air traffic control station to receive transmitted data indicating the location of controlled airspace.

The navigation and guidance module 100 can provide signals to the speed controller 120 to determine the speed of rotation of the rotor 190. The signals are transmitted via a communication means, such as bus 50. The speed controller 120 controls the speed of revolution of the motor/generator 140. This is explained in further detail below.

Furthermore, speed controller 120 can output a signal indicative of the speed of the motor/generator 140 thereby indicating how much energy is harvested by or used by the motor/generator 140.

The aircraft sensors 160 may comprise an airspeed sensor 160a for determining the relative speed between the UAV 10 and the body of air through which it is travelling.

Aircraft sensors 160 may also include altitude sensor 160b, which provides a signal indicative of the altitude of the UAV 10. For example, altitude sensor 160b may comprise a GPS receiver, a barometric altimeter, etc. The signal is sent via the bus 50 to the navigation and guidance module 100.

Aircraft sensors 160 preferably include a pitot sensor comprising both static and dynamic pressure sensors.

The aircraft sensors 160 can therefore be arranged to measure total energy, i.e. the sum of potential and kinetic energy.

The updraft identification module 180 uses data from the aircraft sensors 160 to identify the location and size of updrafts. The process by which this identification is carried out is described below. The updraft identification module 180 provides a signal to the navigation and guidance module 100 via bus 50 to indicate the location and size of updrafts having sufficient upward velocity to lift the UAV 10 when gliding.

The navigation and guidance module 100 can use this signal to control the UAV 10 to manoeuvre within an updraft in order to gain height and/or harvest energy.

FIG. 4 shows an alternative flight management system 210, which is the same as that of FIG. 3, except that the updraft identification module 180 may be replaced by or include a communication device 184. Communication device 184 communicates with an external system, such as a ground station 182 or another UAV 10 or aircraft. Ground station 182 may comprise sensors for identifying the location and size of updrafts, and a transmitter for transmitting data indicating the location and size of updrafts to the communication device 184 of the UAV 10. Another UAV 10 may sense an updraft when flying therethrough (as described below), and transmit the location and size of the updraft to communications device 184.

In other words, the updraft identification module 180 of FIG. 3 and the communication device 184 of FIG. 4 are both means for providing signals representative of the size and location of updrafts, and can be used to identify the location of one or more updrafts having upward velocity greater than a threshold value.

In illustrative embodiments, the updraft identification module 180 identifies the size and location of updrafts as follows:

During flight of the UAV 10, data indicative of height and airspeed for each location is periodically captured by the aircraft sensors 160. The data captured by the aircraft sensors 160 is used to determine the total energy (i.e. the sum of potential energy and kinetic energy) of the UAV 10.

The updraft identification module 180 can use the signal from the speed controller 120 indicating the speed of the motor/generator 140 to determine the effect of the motor/generator 140 on total energy. This effect can therefore be filtered out by the updraft identification module 180.

A queue of readings of location of the UAV 10 along with the rate of change of the measured total energy (corrected to remove the effect of the motor/generator 140) is stored.

"Guidance and Control of an Autonomous Soaring UAV" by Michael J. Allen of NASA Drysden Flight Research Centre, February 2007 (NASA/TM-2007-214611), the full contents of which is incorporated herein by reference, discloses mathematical methods for determining the shape of updrafts/thermals from such readings.

The stored readings can be processed by these known methods to determine the location of the centre of the updraft and a distance indicating the size of the region of the updraft that is sufficient to provide lift to the UAV 10.

This can be done by defining a function representing updraft velocity as a function of distance from the updraft's centre, converting this into equivalent total energy readings, and then fitting the curve to the stored data to determine the centre location of the updraft (in the horizontal plane, e.g. in terms of longitude and latitude).

Using the technique described above, it is possible for the UAV 10 to take periodic measurements of total energy and determine from a sequence of those measurements the size and location of an updraft.

The speed controller 120 can be used to determine the speed of the motor/generator 140 when powered by the battery 200. When the motor/generator 140 is used as a generator to charge the battery 200, the speed controller 120 can be used to control the amount by which the motor/generator resists the rotation of the rotor 190. In this way the speed controller can use the generator to carry out regenerative braking of the rotor 190. The speed controller 120 reduces the speed of rotation of the rotor 190 by drawing more power using the generator, thereby increasing the rate at which the battery 200 is charged. This increases the drag of the UAV 10, thus slowing the UAV 10 and reducing lift.

Conversely, the speed controller 120 can allow the rotor 190 to rotate faster, reducing drag and increasing lift. This results in lower power provided by the generator to the battery 200.

Preferably, the motor/generator 140 is a brushless motor.

The flight management system described above can be used to control the UAV 10 to operate in a number of modes.

The UAV 10 can operate in one or more powered modes. In the powered modes, the energy stored in the battery 200 can be utilised for propulsion of the UAV 10. In the case of the UAV 10 described above, this would mean that the battery 200 can be called upon to provide power to the motor/generator 140 to drive the rotor 190 to rotate.

In the powered modes, the UAV 10 is controlled by the navigation and guidance module 100 of the flight management system to glide along a track. Optionally in such a mode, the navigation and guidance module 100 can control the UAV 10 to navigate towards an updraft. For example, an updraft identified by the communications device 184 of FIG. 4.

The UAV 10 can operate in one or more gliding modes in which it is not propelled. In the case of the UAV 10 described above, this would mean that the battery 200 does not provide power to the motor/generator 140 to drive the rotor 190 to rotate. Instead, the motor/generator 140 is driven to rotate by the rotor 190 to harvest energy as it passes through a body of air. The speed controller 120 can be used to control whether the rotor 190 rotates freely (hindered only by friction) or is restricted from rotating by the action of the motor/generator 140 as it generates electricity. The speed controller 120 can also be used to control the extent to which the speed controller 120 restricts the rotor 190 from rotating thereby controlling the rate at which the motor/generator 140 generates electricity.

In the gliding modes, the navigation and guidance module 100 can actuate the control surfaces 185 of the UAV 10 to manoeuvre the UAV 10.

One of the gliding modes may be a first gliding mode in which the UAV 10 is controlled by the navigation and guidance module 100 of the flight management system to glide along a track.

Optionally in such a mode, the navigation and guidance module 100 can control the UAV 10 to navigate towards an updraft identified by the communications device 184 of FIG. 4.

In a second gliding mode the UAV 10 is instructed to keep its lateral position within the area of an updraft to take advantage of the increase in altitude achieved. This may be achieved by manoeuvring the UAV 10 in a looped track (for example, by maintaining a circular track). In this second gliding mode, the UAV 10 altitude is allowed to increase by the upward flow of air within the updraft. When the altitude reaches the threshold altitude, the navigation and guidance module 100 can instruct the speed controller 120 to reduce the rotational speed of the rotor 190 by drawing more power from the motor/generator 140. This in turn will increase the drag of the gliding UAV, reducing its forward speed and thus lift, to thereby prevent an increase in altitude. Preferably, the amount of power drawn from the motor/generator 140 is modulated to maintain an altitude at or slightly below the maximum permitted altitude. The motor/generator 140 can therefore harvest energy from the updraft once the UAV 10 reaches the threshold altitude.

It may not always be desirable to increase the altitude of the UAV 10. In a third gliding mode, the UAV 10 is also instructed to keep its lateral position within the area of the updraft. However, the speed of rotation of the rotor 190 may be modulated to maintain a constant altitude of the UAV 10 within the updraft by controlling the drag of the gliding UAV to thereby control its forward speed and lift. The motor/generator 140 can therefore harvest energy from the updraft without the UAV 10 altitude increasing.

Finally, a fourth gliding mode may optionally be provided (in addition to or instead of the second mode) in which the motor/generator 140 draws energy from the forward motion of the UAV 10 at a rate that varies in dependence upon the bank angle of the UAV 10 whilst flying in a looped track. Specifically, the bank angle can be modulated to control the radius of the loop followed by the UAV 10. A loop with a larger bank angle will result in a loop with a smaller radius in which the forward speed of the UAV 10 is greater and thus more power is harvested by the rotor 190. Conversely, a loop with a smaller bank angle will result in a loop with a larger radius in which the forward speed of the UAV 10 is lower and thus less power is harvested by the rotor 190. In this fourth gliding mode, the UAV 10 altitude is allowed to increase by the upward flow of air within the updraft until the maximum permitted altitude is reached, and then the altitude of the UAV 10 is maintained by flying the UAV 10 in a looped track (preferably, a generally circular track) and modulating the bank angle of the UAV 10.

A fifth gliding mode may be provided in which the UAV 10 altitude is not allowed to increase by the upward flow of air within the updraft, but is simply maintained at a desired height by flying the UAV 10 in a looped track (preferably, a generally circular track) and modulating the bank angle of the UAV 10.

In the second to fifth gliding modes, it is possible that the updraft location may drift (perhaps because of prevailing winds). Therefore, since the UAV 10 maintains its position in the updraft, it will drift with the updraft whilst flying in the looped track. In other words, the looped track followed by the UAV 10 will move with the updraft.

Preferably, in the second to fifth gliding modes, the UAV 10 will fly in an approximate circular track about the identified centre of the updraft, within the updraft at a distance of 65% the width of the updraft.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method of an unmanned aerial vehicle configured to glide within a geographic region, the unmanned aerial vehicle comprising a generator arranged to be driven by a rotor, the method comprising:
   defining a maximum altitude threshold for the geographic region, above which the unmanned aerial vehicle is not permitted to be flown;
   identifying a location of at least one identified updraft within the geographic region;
   manoeuvring the unmanned aerial vehicle within the identified updraft; and
   harvesting energy from motion of the unmanned aerial vehicle within the updraft by regenerative braking of the rotor to thereby maintain an altitude at or below the maximum altitude threshold;
   wherein at least one of the defining, the identifying, and the maneuvering is via a flight management system controlling the unmanned aerial vehicle; and wherein the unmanned aerial vehicle is maneuvered within the identified updraft with a bank angle that controls the altitude of the unmanned aerial vehicle.

2. The method of claim 1, wherein regenerative braking of the rotor controls the altitude of the unmanned aerial vehicle.

3. The method of claim 1, further comprising manoeuvring the unmanned aerial vehicle to the identified updraft.

4. The method of claim 3, wherein the generator is a motor arranged to drive the rotor, and the manoeuvring of the unmanned aerial vehicle to the identified updraft comprises driving the rotor with the motor to propel the unmanned aerial vehicle.

5. The method of claim 1, further comprising manoeuvring the unmanned aerial vehicle along a looped track to maintain a position of the unmanned aerial vehicle within the identified updraft.

6. The method of claim 1, further comprising storing the harvested energy in a battery.

7. An unmanned aerial vehicle configured to glide comprising:
   a generator arranged to be driven by a rotor; and
   a battery,
   wherein:
     the unmanned aerial vehicle can operate in an energy harvesting mode in which motion of the unmanned aerial vehicle drives the rotor to rotate, the rotor drives the generator, and the generator charges the battery;
     and in the energy harvesting mode, regenerative braking of the generator reduces a forward speed of the unmanned aerial vehicle to generate electricity and prevent the unmanned aerial vehicle from flying above a predetermined altitude defined for a geographic region; and in the energy harvesting mode, the unmanned aerial vehicle is maneuvered with a bank angle that controls the altitude of the unmanned aerial vehicle.

8. The unmanned aerial vehicle of claim 7, wherein, in the energy harvesting mode, the regenerative braking of the generator controls the altitude of the unmanned aerial vehicle.

9. The unmanned aerial vehicle of claim 7, comprising a second motor, wherein the unmanned aerial vehicle can operate in a powered mode,
   in the powered mode the battery powers the second motor to propel the unmanned aerial vehicle.

10. The unmanned aerial vehicle of claim 7, wherein the generator is a motor arranged to drive the rotor to rotate to propel the unmanned aerial vehicle in a powered mode.

11. The unmanned aerial vehicle of claim 7, wherein the generator is a brushless motor.

12. The unmanned aerial vehicle of claim 7, further comprising module that identifies a location of one or more updrafts having upward velocity greater than a threshold value.

13. The unmanned aerial vehicle of claim 12, wherein the module that identifies the location of the one or more updrafts comprises a communication device arranged to receive air flow data indicative of the location of the one or more updrafts and to output data identifying the location of the updraft.

* * * * *